(12) United States Patent
Kokubun et al.

(10) Patent No.: US 7,170,556 B2
(45) Date of Patent: Jan. 30, 2007

(54) IMAGE SENSOR PROVIDING IMPROVED IMAGE QUALITY

(75) Inventors: Masatoshi Kokubun, Aichi (JP); Toshitaka Mizuguchi, Kawasaki (JP); Jun Funakoshi, Kawasaki (JP); Hiroshi Kobayashi, Kawasaki (JP); Katsuyosi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 776 days.

(21) Appl. No.: 10/618,851

(22) Filed: Jul. 15, 2003

(65) Prior Publication Data

US 2004/0119853 A1 Jun. 24, 2004

(30) Foreign Application Priority Data

Jul. 25, 2002 (JP) ............................. 2002-216848
Oct. 31, 2002 (JP) ............................. 2002-317032

(51) Int. Cl.
*H04N 5/217* (2006.01)

(52) U.S. Cl. ................. 348/241; 348/221.1; 348/222.1; 250/208.1; 250/214 R

(58) Field of Classification Search ............. 348/221.1, 348/222.1, 241, 244; 250/208.1, 214 R; 327/514, 515
See application file for complete search history.

(56) References Cited

U.S. PATENT DOCUMENTS 6,423,957 B1 * 7/2002 Kim et al. ............... 250/208.1
6,667,768 B1 * 12/2003 Fossum ....................... 348/308
6,803,958 B1 * 10/2004 Wang ........................... 348/308
2002/0118289 A1 * 8/2002 Choi ............................ 348/308

FOREIGN PATENT DOCUMENTS

JP 2002-218324 2/2002

\* cited by examiner

*Primary Examiner*—Vivek Srivastava
*Assistant Examiner*—Chriss S. Yoder
(74) *Attorney, Agent, or Firm*—Arent Fox PLLC

(57) ABSTRACT

An image sensor for capturing image, has: a plurality of pixels arranged in a matrix each including a photoelectric conversion element for generating current according to received light intensity and a reset transistor for resetting a node of the photoelectric conversion element to a reset potential; and a sample hold circuit for sample holding a pixel potential according to the potential of the node of the pixel. And the sample hold circuit outputs the differential potential, between a first pixel potential at an end of the integration period after a first reset operation of the pixel and a second pixel potential at an end of a reset noise read period after a second reset operation after the integration period, as a pixel signal. Also in the sample hold circuit, when the second pixel potential during the reset noise read period exceeds a predetermined threshold level, the second pixel potential is set to a predetermined reference potential.

10 Claims, 7 Drawing Sheets

IMAGE SENSOR PROVIDING IMPROVED IMAGE QUALITY

CROSS-REFERENCE TO RELATED APPLICATIONS

This application is based upon and claims the benefit of priority from the prior Japanese Patent Applications No. 2002-216848, filed on Jul. 25, 2002 and No. 2002-317032, filed on Oct. 31, 2002, the entire contents of which are incorporated herein by reference.

BACKGROUND OF THE INVENTION

1. Field of the Invention

The present invention relates to an image sensor where pixels having photoelectric conversion elements are arranged in a matrix, and more particularly to an image sensor which can improve image quality of an image which is partially bright, such as sunlight.

2. Description of the Related Art

An image sensor, such as a CMOS image sensor, has photoelectric conversion elements at pixels, converts the intensity of light which enters during a predetermined integration period into electric signals, performs image processing, and outputs image signals. When a row select line is driven, the photoelectric conversion signal of the pixel connected to the row select line is held by a sample hold circuit which is disposed in each column, and this detection signal being held is sequentially output according to the horizontal scanning pulse.

Such a CMOS image sensor is disclosed, for example, in Japanese Patent Laid-Open No. 2002-218324.

A pixel of a conventional image sensor is comprised of a photodiode which is a photoelectric conversion element, a reset transistor for resetting cathode potential thereof, an amplifying transistor for amplifying the cathode potential, and a selecting transistor, for example. After the cathode potential of the photodiode is reset to the reset potential, the decreased cathode voltage, which is decreased by the current which the photodiode generates according to the received light intensity during a predetermined integration period, is held by the sample hold circuit as the photoelectric conversion voltage.

Reset noise is superimposed on the cathode potential at reset. This reset noise is different depending on the pixel since reset noise depends on the dispersion of the transistor characteristics and the dispersion of the parasitic capacitance in the pixel. To remove the reset noise from the detected voltage, the sample hold circuit is comprised of a correlative double sampling circuit. The correlative double sampling circuit sample holds the cathode potential at the completion of the integration period after the first reset operation, and after the second reset operation being executed immediately after this, sample holds the reset noise, which is generated after the subsequent reset noise read period. And the differential voltage of the two sample hold voltages is output as the pixel signal. Reset noise is removed from the detected signals by determining the difference of the two sample hold voltages.

However, when an area where brightness is much higher than the surrounding images, such as sunlight, exists locally in the captured image, the photoelectric conversion current generated by the photodiode becomes extremely high in the corresponding pixel. This higher brightness rapidly decreases the cathode potential during the reset noise read period after the second reset operation. As a result, the differential voltage of the two sample hold voltages becomes very small. In other words, the pixel signal level to be detected in an area where brightness is high, such as sunlight, is supposed to be the maximum level, but the expected pixel signal level cannot be obtained because the reset noise read at the end of the reset noise read period becomes too high. As a result, the output image to be obtained becomes an image where the brightness of the sun is extremely low, and the sun becomes completely black in an extreme case.

SUMMARY OF THE INVENTION

With the foregoing in view, it is an object of the present invention to provide an image sensor for sample holding detected signal of each pixel by correlative double sampling, wherein an output image with appropriate brightness can be generated even if an image with high brightness exists locally.

To achieve the above object, one aspect of the present invention is an image sensor for capturing image, comprising: a plurality of pixels arranged in a matrix each including a photoelectric conversion element for generating current according to received light intensity and a reset transistor for resetting a node of the photoelectric conversion element to a reset potential; and a sample hold circuit for sample holding a pixel potential according to the potential of the node of the pixel. And the sample hold circuit outputs the differential potential, between a first pixel potential at an end of the integration period after a first reset operation of the pixel and a second pixel potential at an end of a reset noise read period after a second reset operation after the integration period, as a pixel signal. Also in the sample hold circuit, when the second pixel potential during the reset noise read period exceeds a predetermined threshold level, the second pixel potential is set to a predetermined reference potential.

According to the above mentioned aspect of the invention, when an image whose brightness is high exists locally, it is prevented that the second pixel potential becomes a potential which far exceeds the reset noise by exposure during the reset noise read period, and that the pixel signal level, that is the differential potential between the first pixel potential and the second pixel potential, is excessively decreased. In other words, when the second pixel potential exceeds the predetermined threshold level, the correlative double sample function of the sample hold circuit is disabled, so that the differential voltage from the reset level to the first pixel potential is detected in stead of the differential voltage between the first pixel potential and the second pixel potential. As a result, a drop in the image quality in a local area where brightness is high can be prevented.

DESCRIPTION OF THE PREFERRED EMBODIMENTS

Embodiments of the present invention will now be described with reference to the accompanying drawings. The protective scope of the present invention, however, is not limited to the following embodiments, but encompasses the invention stated in the claims and equivalents thereof.

Figure 1:
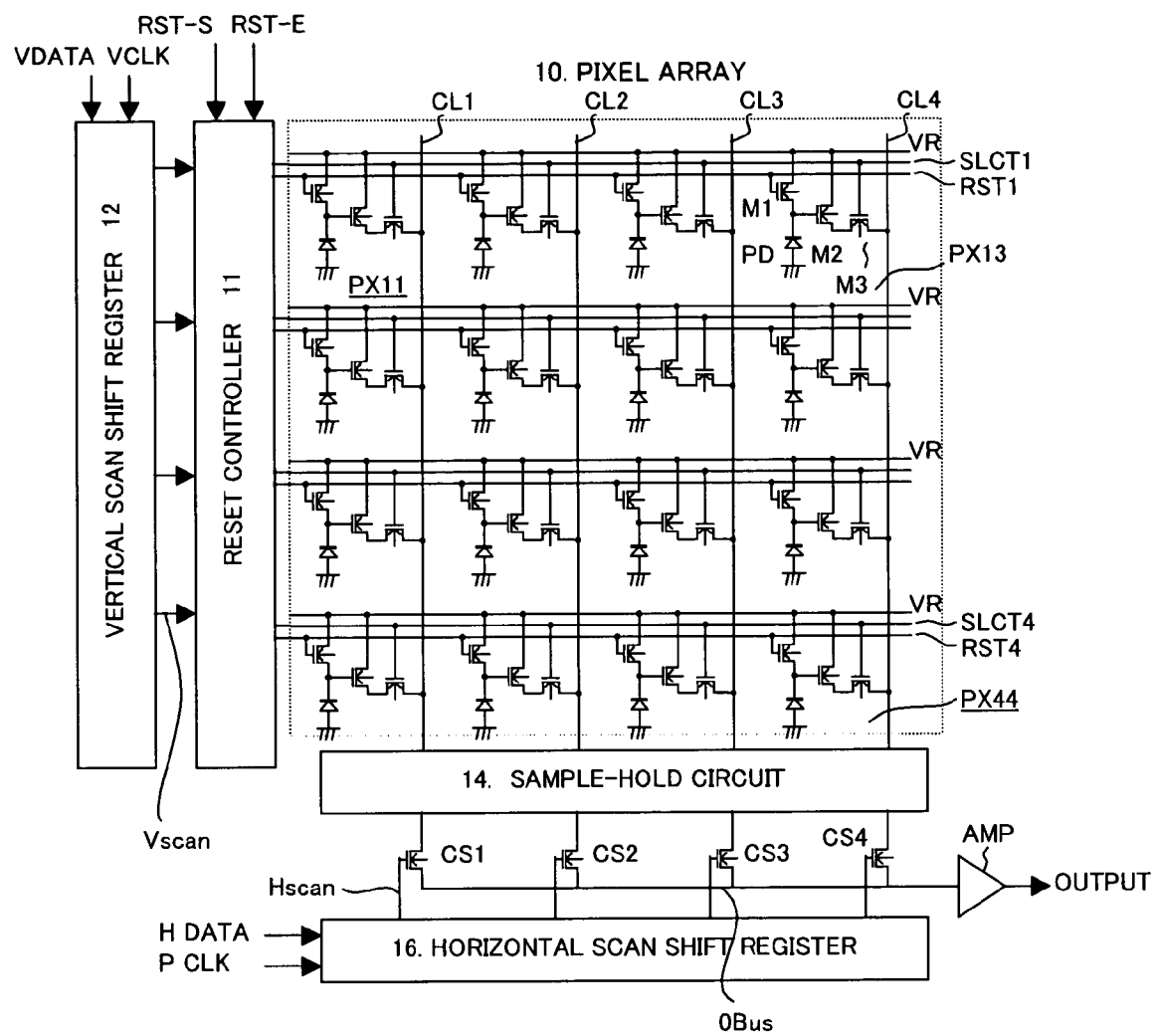
FIG. 1 is a diagram depicting a configuration of a pixel array of a CMOS image sensor according to the present embodiment.

FIG. 1 is a diagram depicting the configuration of a pixel array of the CMOS image sensor according to the present embodiment. The pixel array 10 is comprised of a plurality of reset power supply lines VR, row select lines SLCT1–4, and reset control lines RST1–4, which are arranged in the row direction, a plurality of column lines CL1–4 arranged in the column direction, and pixels PX11–PX44 which are arranged at intersections between each row select line, reset control line and column line. Each pixel has a photoelectric conversion circuit, which is comprised of a reset transistor M1, a photodiode PD which is a photoelectric conversion element, a source follower transistor M2 which amplifies cathode potential which is one node of the photodiode, and a selecting transistor M3 which connects the source of the source follower transistor M2 and the column line CL responding to the driving of the row select line SLCT. The anode, which is the other node of the photodiode, is connected to the reference potential, such as a ground.

The driving of the row select line SLCT1-4 arranged in the row direction and the reset control lines RST1–4 are controlled by the vertical scan shift register 12 and the reset control circuit 11. In other words, the vertical scan shift register 12 is a vertical scan circuit for generating a vertical scan signal Vscan, transfers "1" of data VDATA in serial responding to the vertical scan clock VCLK, and generates the vertical scan signal Vscan for selecting each row. Responding to this vertical scan signal, the row select lines SLCT0–3 are sequentially driven.

Each column line CL1-4 arranged in the column direction is connected to the sample hold circuit 14 respectively. The sample hold circuit 14 amplifies the photoelectric conversion signal, which is supplied from each pixel via the column line CL, as described later, deletes reset noise which occurs with the reset operation, and outputs the pixel signal.

The pixel signal which is output from the sample hold circuit 14 is output to the common output bus OBUS via the column select transistors CS1–4, which are selected by the horizontal scan signal Hscan generated by the horizontal scan shift register 16, and is amplified by the amplifier AMP connected to the output bus. The output of the amplifier AMP is supplied to the color processor, which is not illustrated.

Figure 2:
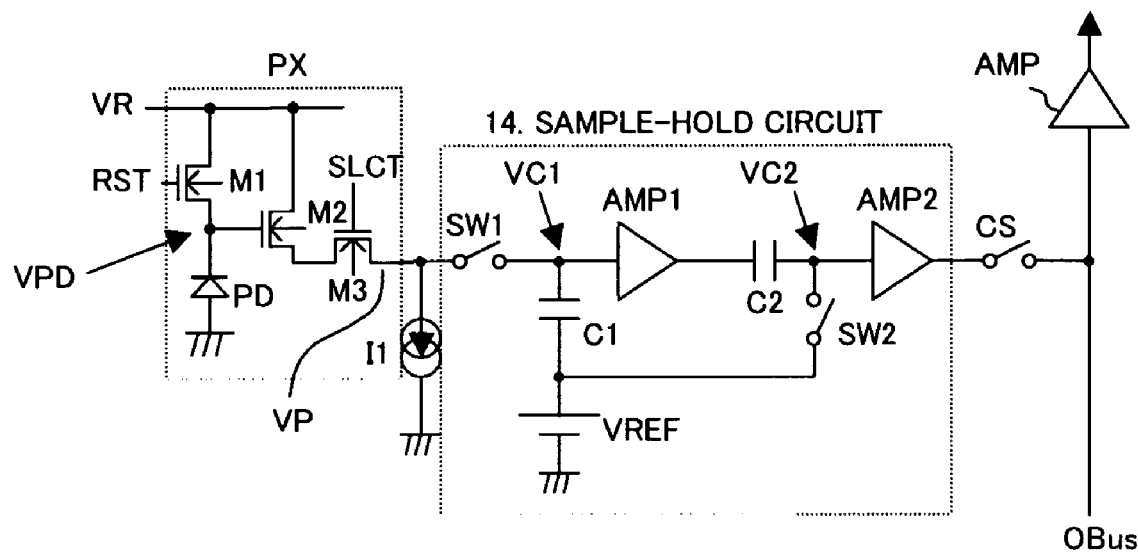
FIG. 2 is a diagram depicting a conventional sample hold circuit.
Figure 3:
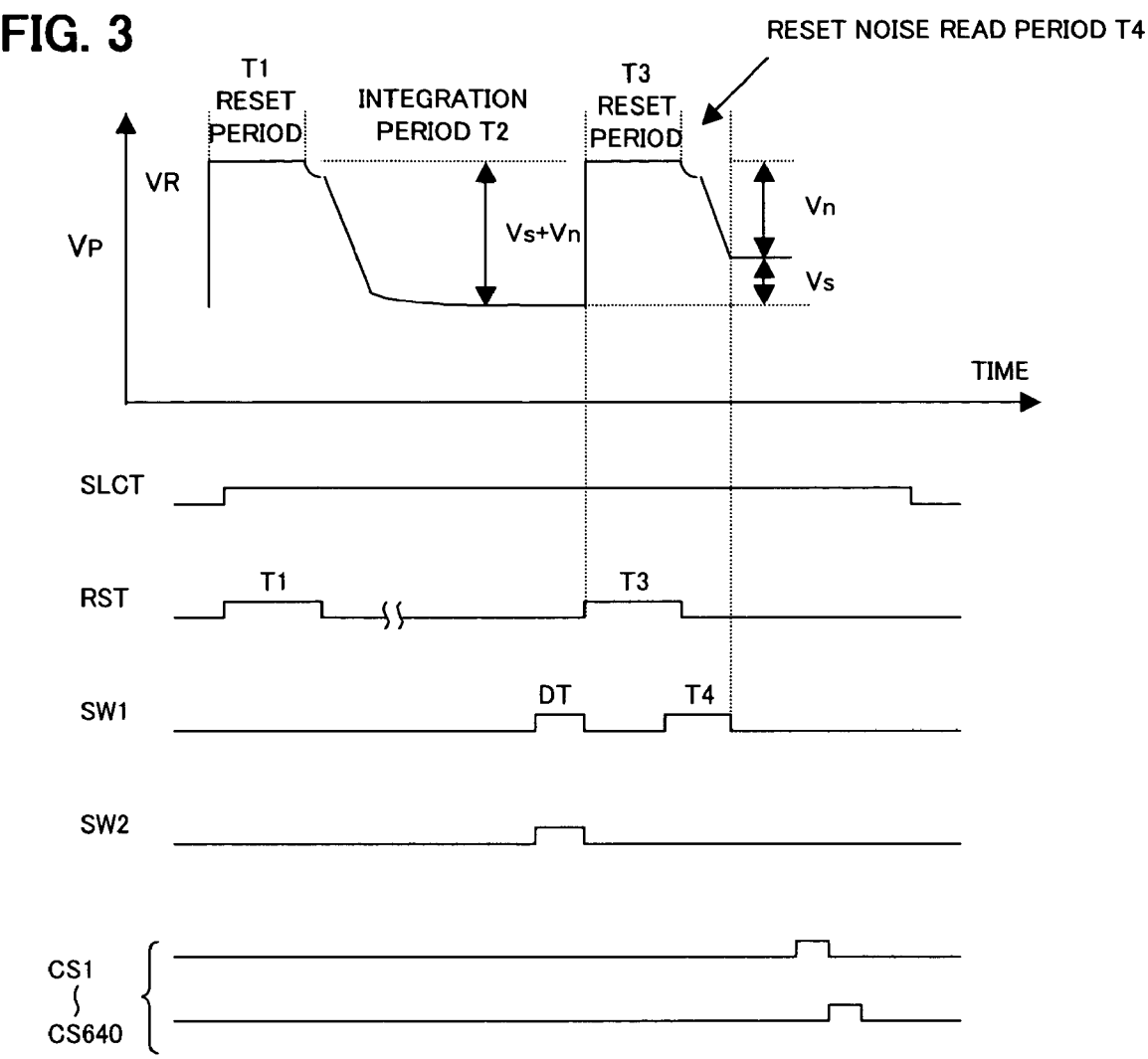
FIG. 3 is a signal waveform diagram depicting the operation of the sample hold circuit.

FIG. 2 is a diagram depicting a conventional sample hold circuit, and FIG. 3 is a signal waveform diagram depicting operation of the sample hold circuit. FIG. 2 shows a circuit of one pixel PX and a sample hold circuit 14 which is connected to the pixel PX via a column line, which is not illustrated. The sample hold circuit 14 is comprised of a first switch SW1, a second switch SW2, a first sample hold capacitor C1, a second sample hold capacitor C2, a reference voltage VREF, and a first and second amplifiers AMP1 and AMP2, and this sample hold circuit 14 is a correlative double sampling circuit for canceling the reset noise of the photoelectric conversion circuit of the pixel. A current source I1 is disposed between the pixel PX and the sample hold circuit 14.

Operation of this pixel PX and the sample hold circuit 14 will be described with reference to FIG. 3. In FIG. 3, the voltage change of the pixel potential Vp, which is output corresponding to the cathode voltage VPD of the photodiode D1 in the pixel, is shown in association with the row select line SLCT, reset control line RST, and the first and second switches SW1 and SW3. For simplification, it is assumed that the row select line SLCT is driven to H level and the selecting transistor M3 is in ON status.

At first, in the first reset period T1, the reset control line RST is driven to H level, the reset transistor M1 is turned ON, and the cathode potential VPD of the photodiode PD is set to the reset level VR. The pixel potential Vp corresponding to the cathode potential VPD also becomes the corresponding reset level. When the reset control line RST becomes L level and the reset transistor M1 becomes OFF, the cathode potential VPD gradually decreases its level according to the intensity of the input light by the current generated by the photodiode PD. This is the integration period T2. However, when the reset transistor M1 turns OFF, the reset noise Vn is generated. This reset noise Vn is voltage which is dispersed depending on the pixel.

After the predetermined integration period T2 has elapsed, the switches SW1 and SW2 are temporarily turned ON, and the drive current from the source follower transistor M2, which is generated according to the cathode potential VPD, charges the capacitor C1 via the selecting transistor M3 and the column line, which is not illustrated. By this sampling operation, the node VC1 becomes a potential VR−(Vs+Vn), that is the potential of the reset voltage VR minus the sum (Vs+Vn) of the reset noise voltage Vn and the potential Vs, which dropped during the integration period T2. The potential of the node VC1 is also transferred to the second capacitor C2 via the first amplifier AMP1.

At this time, the second switch SW2 is also in ON status, and if the amplification factor of the first amplifier AMP1 is 1, then the second capacitor C2 is also charged to be the same voltage status as the first capacitor. In this status, the differential voltage between the level VR−(Vs+Vn) and the reference voltage VREF is applied to the first and second capacitors C1 and C2. When the switch SW1 is controlled to be OFF, the first and second capacitors hold the above mentioned level.

After the integration period T2 ends, the reset pulse is supplied again to the reset control line RST, and the reset transistor M1 turns ON. By this second reset operation, the cathode potential VPD is charged to the reset level VR again. This is the second reset period T3. Then at the reset noise read period T4, the first switch SW1 is temporarily turned ON. At this time, the second switch SW2 is maintained to be OFF status. In this reset noise read period T4 as well, the level of the cathode potential VPD is decreased according to the intensity of the received light by the current of the photodiode, just like the integration period T2. This reset noise read period T4, however, is set to be shorter than the integration period T2.

During this reset noise read period T4, the switch SW1 becomes ON status, and the node VC1 of the first capacitor C1 becomes the level VR−Vn, that is the reset voltage VR from which reset noise Vn is dropped. This potential VR−Vn is also transferred to the terminal of the second capacitor C2 via the first amplifier AMP1. At this time, the second switch SW2 is in OFF status, so the node VC2 of the second capacitor C2 is in open status. Therefore at the node VC2 of the second capacitor C2, the fluctuation of the differential voltage Vs, between the potential VR−(Vs+Vn) of the node VC1 when the integration period T2 is ended and the potential VR−Vn of the node VC1 when the reset noise read period T4 is ended, is generated, and the voltage VREF+Vs, which is the reference voltage VREF at the first sampling added to the differential voltage Vs, is generated in the node VC2. In other words, the reset noise Vn is removed from this voltage VREF+Vs.

By setting the reference potential of the second amplifier AMP2 to VREF, the detected voltage Vs, which was integrated according to the intensity of the received light, is amplified by the second amplifier AMP2, and is output to the output bus OBUS via the column gate CS which is sequentially controlled ON/OFF by the horizontal scan signal generated by the horizontal scan shift register 16. And this output voltage is amplified by the common amplifier AMP disposed in the output bus OBUS, and is supplied to the A/D conversion circuit in the subsequent stage as pixel signals.

The waveform of the pixel potential Vp shown in FIG. 3 is an example of pixels corresponding to an image which brightness is high locally. In other words, the integration period T2 is controlled to be short, but the pixel potential Vp rapidly decreased and is saturated in a short time. Along with this, the detected voltage Vs, during the first sample hold operation when the switches SW1 and SW2 turn ON, reaches the maximum value. And although the reset noise read period T4 after the second reset operation T3 is short, the pixel potential Vp thereof rapidly decreases, and the level to be detected as the reset noise Vn during the second sample hold operation T4 when the switch SW1 turns ON becomes extremely high. Therefore the detected voltage Vs=(VR−Vn)−{VR−(Vs+Vn)}, which is determined by the correlative double sampling, is lower than the original level corresponding to high brightness.

The reset noise read period T4 must have a certain length to secure a margin between the reset control signal RST and operation of the first switch SW1, but in the case of the above mentioned image which has high brightness, the pixel potential Vp rapidly decreases even during such a short period T4, and reset noise Vn, which far exceeds the originally designed reset noise, is sample held.

Figure 4:
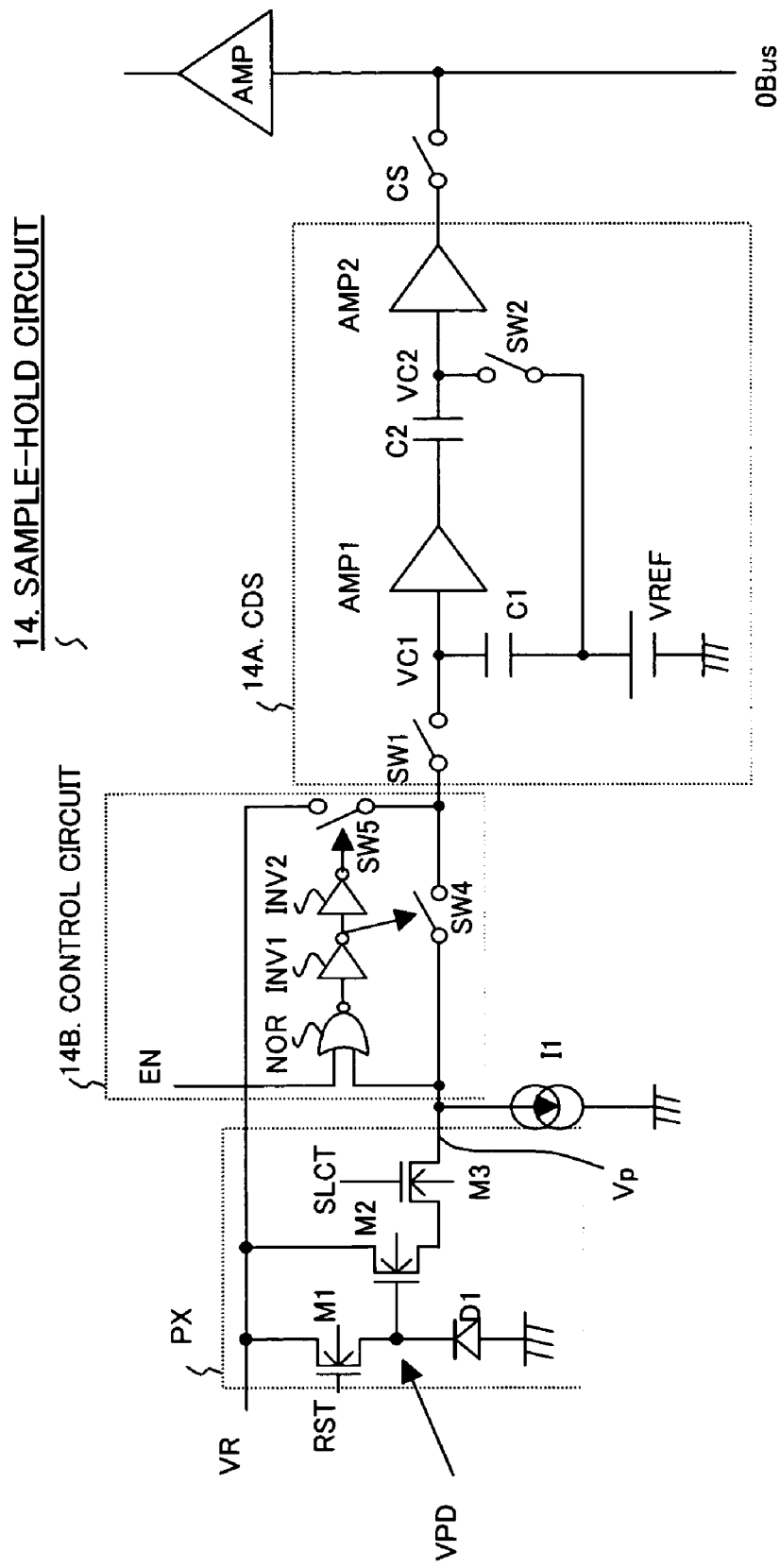
FIG. 4 is a diagram depicting a sample hold circuit according to the present embodiment.

FIG. 4 is a diagram depicting the sample hold circuit according to the present embodiment. The pixel PX is the same as FIG. 2. The sample hold circuit 14 comprises the correlative double sampling circuit 14A, and the control circuit 14B for controlling whether the correlative double sampling circuit is disabled or not. The correlative double sampling circuit 14A in FIG. 4 has the same configuration as the sample hold circuit in FIG. 2. The control circuit 14B is disposed between the column line and the correlative double sampling circuit 14A in the sample hold circuit 14 which is connected to the column lines CL1–4, as shown in FIG. 1.

The control circuit 14B comprises the switches SW4 and SW5, and further comprises the NOR gate NOR, and the inverters INV1 and INV2. The switch SW4 which is disposed between the pixel PX and the correlative double sampling circuit 14A is controlled by the output of the inverter INV1, and is controlled to be ON when this output is at H level. The switch SW5 disposed between the correlative double sampling circuit 14A and the reset power supply VR is controlled by the output of the inverter INV2, and is controlled to be ON when the output thereof is at H level, just as above. The enable signal EN for controlling enable/disable of the control circuit 14B is input to one input terminal of the NOR gate NOR, and the pixel potential Vp is input to the other input terminal.

Figure 5:
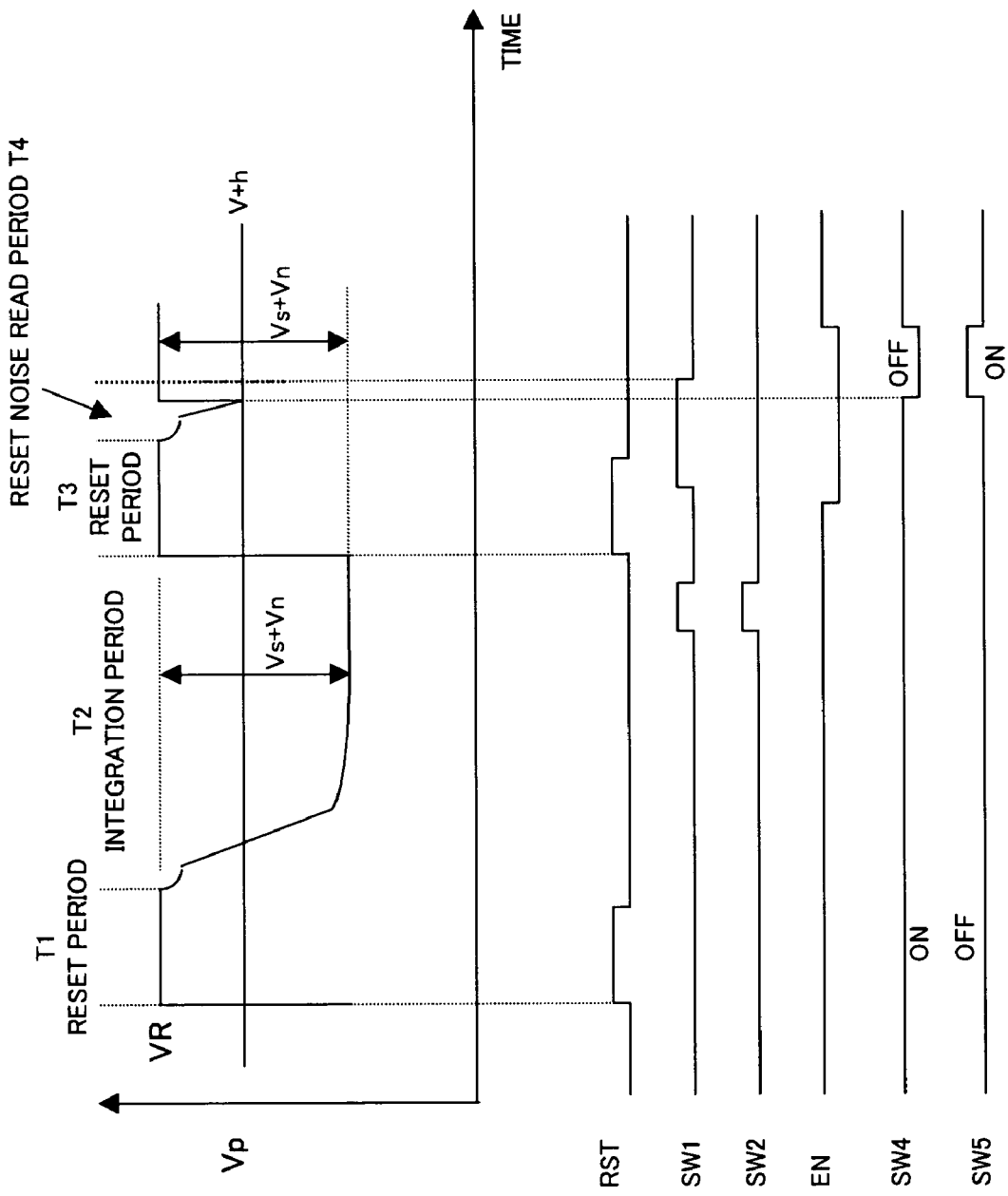
FIG. 5 is a diagram depicting the operation of the sample hold circuit according to the present embodiment.

FIG. 5 is a diagram depicting operation of the sample hold circuit according to the present embodiment. This example is an operation example when an image which brightness is high locally, just like FIG. 3, is captured. The reset operation in the first reset period T1 and the first sample hold operation, which is performed when turning the switches SW1 and SW2 ON at the end of the integration period T2, are the same as the case of FIG. 3. During these operations, control is such that the enable signal EN is at H level (disabled status), the control circuit 14B is in disabled status, the switch SW4 is ON, and the switch SW5 is OFF. Therefore the node voltage VC1 in the correlative double sampling circuit 14A becomes the voltage VR−(Vs+Vn), which is the difference between the sum (Vs+Vn) of the reset noise Vn and the detected voltage Vs and the voltage VR corresponding to the reset voltage. In the output of the first amplifier AMP1 is also the same as the case of FIG. 3 on the assumption of gain=1.

Then in the second reset period T3, the enable signal EN is set to L level (enabled status). This makes the NOR gate NOR active status, and when the pixel potential Vp becomes a level lower than the threshold level Vth of the NOR gate NOR, the output of the NOR gate is controlled to be H level. When the reset transistor M1 turns OFF after the second reset period T3, the reset noise read period T4 starts and the level of the cathode voltage VPD decreases according to the intensity of the incident light. Since the brightness is high, the cathode voltage rapidly decreases, the pixel potential Vp also rapidly decreases accordingly, so as to exceed the threshold level Vth of the NOR gate NOR before the hold operation where the first switch SW1 turns OFF.

Responding to this, the output of the NOR gate NOR becomes H level, the output of the first inverter INV1 becomes L level, and the switch SW4 is controlled to be OFF, and at the same time the output of the second inverter INV2 becomes H level, and the switch SW5 is controlled to be ON status. When the switch SW5 turns ON, the node voltage VC1 is forcibly pulled up not to the pixel potential Vp but to the reset power supply VR level. Then the first switch SW1 is turned OFF, and the reset level VR is held by the capacitor C1. In other words, the level of the node potential VC1 becomes the reset level VR, and the output of the first amplifier AMP1 also becomes the reset level VR. Therefore the node voltage VC2 is pulled up from the reference voltage VREF to Vs+Vn+VREF, so that the detected voltage becomes Vs+Vn.

In this sample hold operation, the reset noise Vn is not removed from the detected voltage Vs+Vn. However, the detected voltage Vs is the maximum value or a value close to that, so the problem of a drop in image quality of an output image (maximum gradation level or level near that) is minor, even if a little reset noise is not removed. Rather, image quality is improved compared with prior art, where the reset noise Vn is detected as unnecessarily high and the detected voltage Vs becomes too low, which decreases brightness of the output image even if the output image has high brightness.

Figure 6:
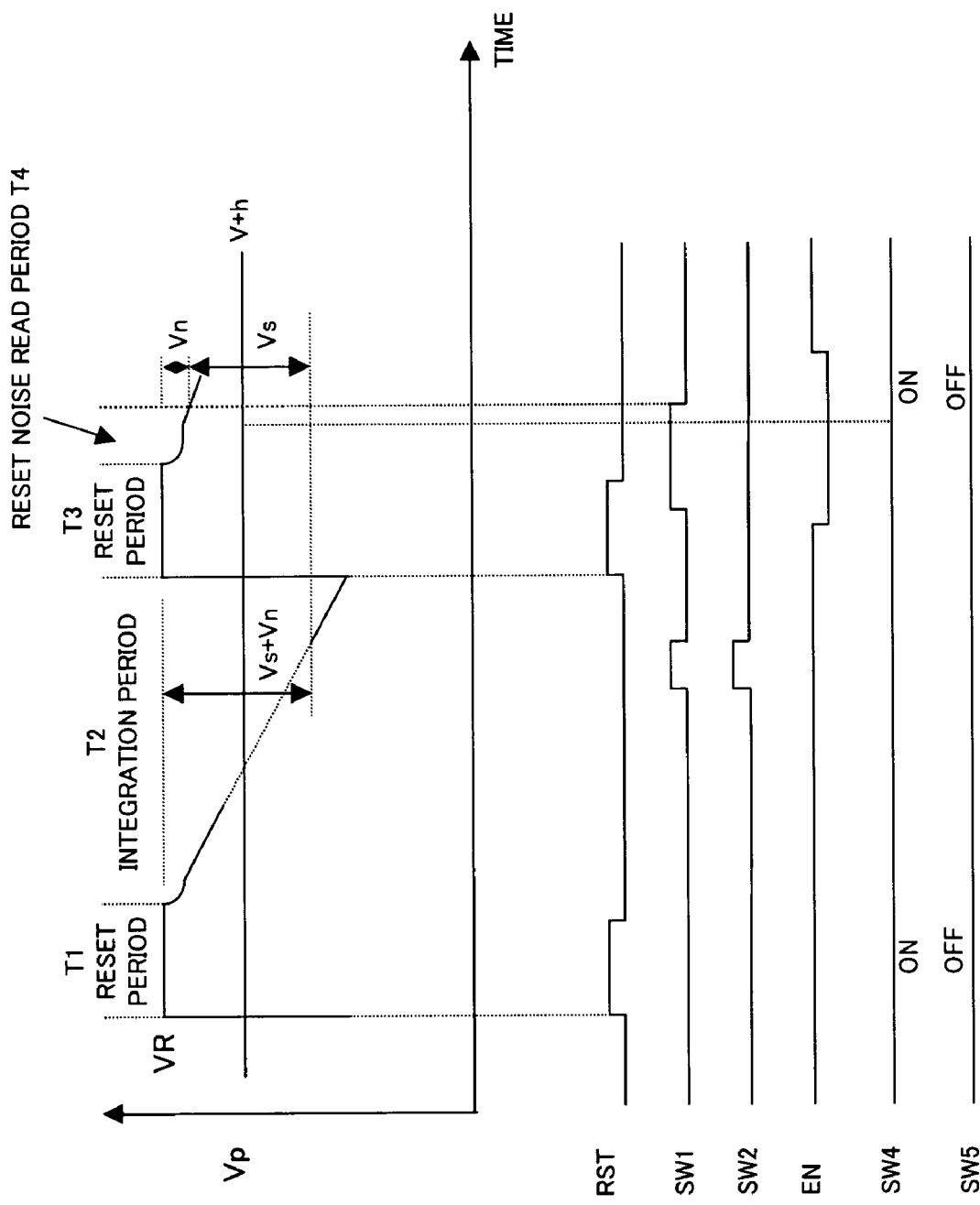
FIG. 6 is a diagram depicting another operation of the sample hold circuit according to the present embodiment.

FIG. 6 is a diagram depicting another operation of the sample hold circuit according to the present embodiment. Unlike FIG. 3, FIG. 6 is an operation example when an image, where brightness is not high, is captured. Since intensity of incident light is low, the current of the photodiode PD in the integration period T2 is relatively low, and therefore the cathode voltage VPD and the pixel potential Vp corresponding thereto gradually decrease. And the pixel potential Vp to be held at the first sample hold at the end of the integration period T2 does not reach the saturation level.

And even in the reset noise read period T4 after the second reset operation T3, the cathode voltage PD and the pixel potential Vp corresponding thereto gradually decrease, and do not exceed the threshold level Vth before the hold operation where the first switch SW1 closes. Therefore the pixel potential Vp, which is the second input of the NOR gate NOR of the control circuit 14B, does not become L level, and the NOR gate output maintains L level. In other words, the output of the first inverter INV1 maintains H level so as to maintain the switch SW4 to be ON status, and the output of the second inverter INV2 is maintained at L level, so the switch SW5 does not turn ON. As a consequence, the appropriate voltage Vs, from which the reset noise Vn has been removed, is detected.

In this way, when the pixels do not have a particularly high brightness, the control circuit 14B controls the operation of the correlative double sampling circuit 14A to be normal operation, so the appropriately detected voltage Vs, from which the reset noise Vn is removed, is detected.

In the above embodiment, the control level by the control circuit 14B can be optimized by appropriately designing the threshold level Vth of the NOR gate. So by enabling the change of the threshold level of the control circuit 14B, the boundary point between enable and disable of the correlative double sampling operation can be changed.

Figure 7:
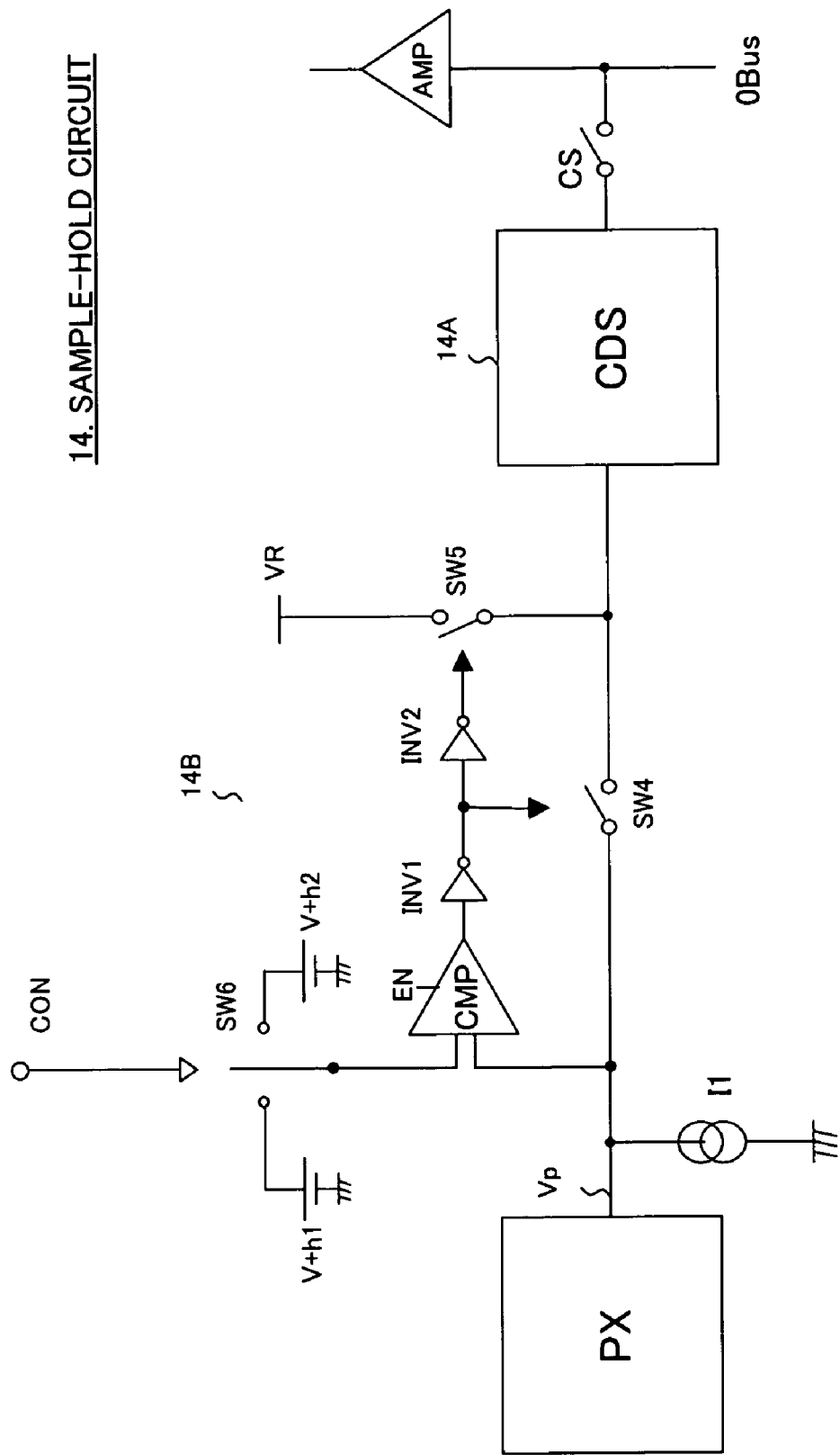
FIG. 7 is a diagram depicting the sample hold circuit according to the second embodiment.

FIG. 7 is a diagram depicting the sample hold circuit according to the second embodiment. The correlative double sampling circuit 14A is the same as the embodiment in FIG. 4. In the second embodiment, the comparator CMP is disposed rather than the NOR gate in FIG. 4, and the output of the comparator is supplied to the first inverter INV1 in the control circuit 14B. And in the comparator CMP, the threshold level to be compared with the pixel potential Vp can be switched between Vth1 and Vth2 (<Vth1) by the switch SW6. The switch SW6 can be switched by the control signal CON which is automatically controlled by a manually controlable external terminal, or by an internal circuit, which is not illustrated.

The higher threshold level Vth1 is selected when an image where brightness is high locally, such as sunlight, is included in the image. If the pixel potential Vp decreases more than the threshold level Vth1 during the reset noise read period T4, the detection level at the second sample hold becomes the reset voltage VR, and operation becomes the same as FIG. 5.

When an image where brightness is very high locally is not included in the image, on the other hand, the normal lower threshold level Vth2 is selected. As a result, the pixel potential Vp does not exceed the threshold level Vth2 during the reset noise read period T4, and the detected level at the second sample hold becomes the reset noise Vn, and operation becomes the same as FIG. 6.

By making the threshold level changeable like this, an output image which is optimized according to the image being captured can be obtained.

The above mentioned change of the threshold level may be automatically set based on the intensity of light received from the captured image. For example, the pixel signal level to be detected is accumulated during one frame period to detect the brightness of the image, and the gain of the amplifier AMP connected to the output bus OBUS is controlled. For example, if the image is dark, gain is increased, and if the image is bright, gain is decreased. And if it is insufficient only to control the gain of the amplifier, then the length of the integration period T2 is adjusted. Such control is performed by the automatic gain control circuit, which is disposed at the output side of the A/D conversion circuit connected at the output side of the amplifier AMP of the output bus.

For example, if the integration period T2 is controlled to be a first period, which is relatively long, the intensity of the received light is relatively low, so the threshold value level Vth is set to high, and the sensitivity of the disable function of the correlative double sampling is increased, so that the image quality of the image where brightness is high locally does not drop. If the integration period T2 is set to a second period, which is relatively short, the intensity of the received light is higher, so the threshold level Vth is set to low, and the sensitivity is decreased, so that the disable function is activated only for an image where brightness is extremely high, which prevents a drop in image quality.

Variable settings may be allowed for the threshold value levels Vth1 and Vth2 by manual operation. In other words, the user who observed the output image can change the setting manually to improve image quality, so that a higher quality output image can be provided.

According to the image sensor of the present invention, the image quality of the image where brightness is high locally can be improved.

What is claimed is:

1. An image sensor for capturing image, comprising:
a plurality of pixels arranged in a matrix, each including a photoelectric conversion element for generating current according to received light intensity and a reset transistor for resetting a node of the photoelectric conversion element to a reset potential; and
a sample hold circuit for sample holding a pixel potential according to a potential of said node of said pixels,
wherein said sample hold circuit outputs, as a pixel signal, a differential potential between a first pixel potential at an end of an integration period after a first reset operation of said pixels and a second pixel potential at an end of a reset noise read period after a second reset operation after said integration period, and
in said sample hold circuit, when said pixel potential during said reset noise read period exceeds a predetermined threshold level, said pixel potential is set to a predetermined reference potential.

2. The image sensor according to claim 1, wherein said predetermined reference potential is said reset potential.

3. The image sensor according to claim 1, wherein the setting of said predetermined threshold value can be changed to a plurality of levels.

4. The image sensor according to claim 3, wherein the setting of said predetermined threshold level can be changed according to the received light intensity from the captured image.

5. An image sensor for capturing image, comprising:
a plurality of pixels arranged in a matrix, each including a photoelectric conversion element for generating current according to received light intensity and a reset transistor for resetting a node of said photoelectric conversion element to a reset potential; and
a sample hold circuit for sample holding a pixel potential according to a potential of said node of said pixels,
wherein said sample hold circuit outputs, as a pixel signal, a first differential potential between a first pixel potential at an end of an integration period after a first reset operation of said pixels and a second pixel potential at an end of a reset noise read period after a second reset operation after said integration period, and
said sample hold circuit outputs, as a pixel signal, a second differential potential between said first pixel potential and the pixel potential at the first reset, in stead of said first differential potential, when said pixel potential during said reset noise read period exceeds a predetermined threshold level.

6. The image sensor according to claim 5, wherein the setting of said predetermined threshold level can be changed to a plurality of levels.

7. The image sensor according to claim 5, wherein the setting of said predetermined threshold level can be changed according to the received light intensity from the captured image.

8. An image sensor for capturing image, comprising:
a plurality of pixels arranged in a matrix, each including a photoelectric conversion element for generating current according to received light intensity and a reset transistor for resetting a node of said photoelectric conversion element to a reset potential; and
a sample hold circuit for sample holding a pixel potential according to the potential of said node of said pixels, wherein said sample hold circuit outputs, as a pixel signal, a differential potential between a first pixel potential at an end of an integration period after a first reset operation of said pixels and a second pixel potential at an end of a reset noise read period after a second reset operation after said integration period, and
said sample hold circuit further comprises a control circuit which detects that said pixel potential exceeds a predetermined threshold level in said reset noise read period so as to set said second pixel potential to the reset potential.

9. The image sensor according to claim 8, wherein the setting of said predetermined threshold level can be changed to a plurality of levels.

10. The image sensor according to claim 8, wherein the setting of said predetermined threshold level can be changed according to the received light intensity from the captured image.

* * * * *